United States Patent
Gole et al.

(10) Patent No.: US 10,824,344 B2
(45) Date of Patent: Nov. 3, 2020

(54) SOLID-STATE DRIVE WITH NON-VOLATILE RANDOM ACCESS MEMORY

(71) Applicant: TOSHIBA MEMORY CORPORATION, Tokyo (JP)

(72) Inventors: Abhijeet Gole, Cupertino, CA (US); Philip A. Kufeldt, San Jose, CA (US)

(73) Assignee: TOSHIBA MEMORY CORPORATION, Tokyo (JP)

( * ) Notice: Subject to any disclaimer, the term of this patent is extended or adjusted under 35 U.S.C. 154(b) by 11 days.

(21) Appl. No.: 16/022,533

(22) Filed: Jun. 28, 2018

(65) Prior Publication Data
US 2019/0034098 A1    Jan. 31, 2019

Related U.S. Application Data

(63) Continuation of application No. 14/672,626, filed on Mar. 30, 2015, now abandoned.

(51) Int. Cl.
| | | |
|---|---|---|
| G06F 12/00 | (2006.01) | |
| G06F 13/00 | (2006.01) | |
| G06F 3/06 | (2006.01) | |
| G06F 12/02 | (2006.01) | |
| G06F 9/4401 | (2018.01) | |

(52) U.S. Cl.
CPC ............ *G06F 3/0619* (2013.01); *G06F 3/064* (2013.01); *G06F 3/068* (2013.01); *G06F 3/0659* (2013.01); *G06F 12/0246* (2013.01); *G06F 9/4418* (2013.01); *G06F 2212/1024* (2013.01); *G06F 2212/1032* (2013.01); *G06F 2212/7201* (2013.01); *G06F 2212/7203* (2013.01)

(58) Field of Classification Search
CPC ........ G06F 3/103; G06F 3/0619; G06F 3/064; G06F 3/0659; G06F 3/068; G06F 9/4418; G06F 12/0246; G06F 2212/1024; G06F 2212/1032; G06F 2212/7201; G06F 2212/7203
USPC .......................................................... 711/103
See application file for complete search history.

(56) References Cited

U.S. PATENT DOCUMENTS

| | | | | |
|---|---|---|---|---|
| 5,519,831 A * | 5/1996 | Holzhammer | ...... | G06F 11/1441 365/228 |
| 5,799,200 A * | 8/1998 | Brant | .................. | G06F 11/1441 365/229 |
| 6,459,175 B1 * | 10/2002 | Potega | .................... | G01R 31/36 307/149 |
| 8,190,822 B2 * | 5/2012 | Iida | ..................... | G06F 11/1441 711/118 |
| 9,223,664 B1 * | 12/2015 | Watson | ............... | G06F 11/2015 |
| 9,760,497 B2 * | 9/2017 | Nakajima | ........... | G06F 13/1663 |
| 2002/0026615 A1 * | 2/2002 | Hewitt | ................ | H03M 13/258 714/752 |

(Continued)

*Primary Examiner* — Sheng Jen Tsai
(74) *Attorney, Agent, or Firm* — Kim & Stewart LLP

(57) ABSTRACT

A solid-state drive includes a flash memory device, a power loss protection circuit, a dynamic random access memory (RAM) coupled to the power loss protection circuit, and a controller configured to direct I/O requests to either the flash memory drive or the RAM. Because the controller can direct I/O request to the RAM, the RAM is revealed as a separate mass storage device to a host. Consequently, the RAM provides additional and significantly higher performance storage capacity to the solid-state drive.

20 Claims, 5 Drawing Sheets

(56) References Cited

U.S. PATENT DOCUMENTS

| | | | |
|---|---|---|---|
| 2004/0054851 A1* | 3/2004 | Acton | G06F 11/1441 711/118 |
| 2005/0138347 A1* | 6/2005 | Haverkamp | G06F 8/65 713/2 |
| 2007/0032228 A1* | 2/2007 | Varanda | G06F 9/4418 455/418 |
| 2007/0168564 A1* | 7/2007 | Conley | G06F 12/0866 710/1 |
| 2007/0276994 A1* | 11/2007 | Caulkins | G06F 3/061 711/113 |
| 2007/0276995 A1* | 11/2007 | Caulkins | G06F 3/0616 711/113 |
| 2007/0276996 A1* | 11/2007 | Caulkins | G06F 3/061 711/113 |
| 2009/0158000 A1* | 6/2009 | Takahashi | G06F 9/445 711/202 |
| 2009/0198874 A1* | 8/2009 | Tzeng | G06F 12/0246 711/103 |
| 2010/0082903 A1* | 4/2010 | Kurashige | G06F 12/0246 711/118 |
| 2011/0125953 A1* | 5/2011 | Sartore | G06F 12/0638 711/103 |
| 2011/0133655 A1* | 6/2011 | Recker | H02J 9/02 315/159 |
| 2013/0080687 A1* | 3/2013 | Nemazie | G06F 12/0246 711/103 |
| 2013/0145085 A1* | 6/2013 | Yu | G06F 12/0246 711/103 |
| 2013/0246689 A1* | 9/2013 | Matsudaira | G06F 12/0246 711/103 |
| 2013/0297857 A1* | 11/2013 | Sela | G06F 9/5027 711/103 |
| 2014/0006695 A1* | 1/2014 | Makuni | G06F 12/0246 711/103 |
| 2014/0082265 A1* | 3/2014 | Cheng | G06F 12/0246 711/103 |
| 2014/0089585 A1* | 3/2014 | Nakajima | G06F 13/1663 711/118 |
| 2014/0089630 A1* | 3/2014 | Pignatelli | G06F 12/1009 711/206 |
| 2014/0192583 A1* | 7/2014 | Rajan | G11C 7/10 365/63 |
| 2014/0258588 A1* | 9/2014 | Tomlin | G06F 3/0688 711/103 |
| 2014/0281145 A1* | 9/2014 | Tomlin | G06F 12/0246 711/103 |
| 2014/0304453 A1* | 10/2014 | Shao | G06F 12/0246 711/103 |
| 2014/0310574 A1* | 10/2014 | Yu | G06F 11/1072 714/773 |
| 2014/0362495 A1* | 12/2014 | Brandon | H01G 11/18 361/502 |
| 2014/0365711 A1* | 12/2014 | Makida | G06F 12/0246 711/103 |
| 2015/0046625 A1* | 2/2015 | Peddle | G11C 16/10 710/308 |
| 2015/0067233 A1* | 3/2015 | Cheng | G06F 12/0246 711/103 |
| 2015/0106410 A1* | 4/2015 | Zaltsman | G06F 16/1847 707/824 |
| 2015/0137596 A1* | 5/2015 | Steiner-Jovic | G01R 15/186 307/24 |
| 2015/0143032 A1* | 5/2015 | Hashimoto | G06F 3/061 711/103 |
| 2015/0186270 A1* | 7/2015 | Peng | G11C 16/16 711/3 |
| 2015/0253831 A1* | 9/2015 | Liu | G06F 1/30 713/320 |
| 2015/0254186 A1* | 9/2015 | Sugimoto | G06F 3/061 711/103 |
| 2015/0301726 A1* | 10/2015 | Mattiuzzo | G06F 3/041 345/173 |
| 2016/0246726 A1* | 8/2016 | Hahn | G06F 12/0862 |
| 2016/0274797 A1* | 9/2016 | Hahn | G06F 16/00 |

* cited by examiner

SOLID-STATE DRIVE WITH NON-VOLATILE RANDOM ACCESS MEMORY

CROSS-REFERENCE TO RELATED APPLICATIONS

This application is a continuation of U.S. patent application Ser. No. 14/672,626, filed Mar. 30, 2015, the entire contents of which are incorporated herein by reference.

BACKGROUND

Solid-state drives (SSDs) generally have faster performance, are more compact, and are less sensitive to vibration or physical shock than conventional magnetic disk drives. Given these advantages, SSDs are being used in more and more computing devices and other consumer products in lieu of or in addition to magnetic disk drives, even though the cost-per-gigabyte storage capacity of SSDs is significantly higher than that of magnetic disk drives.

Typically, the storage capacity of an SSD is implemented with NAND-type memory cells, which are subject to wear with use. For storing data that are continuously updated, e.g., metadata related to operation of an SSD, the SSD may also include dedicated storage implemented with a different type of memory cell, to avoid undue wear of the NAND cells of the SSD. Otherwise, the use of NAND memory cells to store such data would quickly wear these memory cells out. For example, random access memory (RAM), in particular dynamic RAM, is frequently employed for storing such metadata in an SSD, since RAM is composed of cells that can be overwritten an indefinite number of times.

The memory cells of a RAM must be refreshed frequently (e.g., every 64 ms or less) to retain data, so any interruption of power to a RAM device will almost immediately delete any data stored therein. Because the loss of metadata related to operation of an SSD can result in serious malfunction of the SSD, and because RAM devices are often used to store this type of data, RAM cells that store such data are often configured as nonvolatile RAM. In nonvolatile RAM, a RAM device is coupled to a power loss protection circuit and a temporary power source, so that data stored in the RAM can be written to the nonvolatile NAND memory when an interruption of onboard power is detected. However, nonvolatile RAM adds cost to and increases the size of an SSD without increasing the capacity of the SSD to store user data.

SUMMARY

One or more embodiments provide a solid-state drive with a flash memory device, a power loss protection circuit, a RAM coupled to the power loss protection circuit, and a controller configured to direct I/O requests to either the flash memory drive or the RAM, so that the RAM is available for use as a mass storage device. The RAM is revealed as a separate mass storage device to a computing device external to the solid-state drive, thereby providing additional and significantly higher performance storage capacity to the solid-state drive.

A mass storage device, according to an embodiment, includes a flash memory device, a volatile random access memory (RAM) that is coupled to a power loss protection circuit, and a controller. The controller is configured to store a mapping table that maps a first portion of logical block addresses (LBAs) to respective physical locations in the flash memory device and a second portion of the LBAs to respective physical locations in the RAM, and perform read and write operations using the mapping table.

In a data storage device that includes a flash memory device, a volatile RAM device, and a controller, all coupled to a power loss protection circuit, a method of retrieving data from the data storage device, according to another embodiment, includes receiving from a computing device external to the data storage device a read command that references an LBA, based on the LBA, determining a physical location in the RAM, reading a set of data from the determined physical location in the RAM, and transmitting the read data to the computing device.

In a data storage device that includes a flash memory device, a volatile RAM device, and a controller, all coupled to a power loss protection circuit, a method of storing data, according to another embodiment, includes receiving from a computing device external to the data storage device a write command that includes a set of data and references an LBA, writing the set of data to a physical location in the RAM, and updating an entry in a mapping table to indicate a one-to-one correspondence between the LBA and the physical location in the RAM.

DETAILED DESCRIPTION

Figure 1:
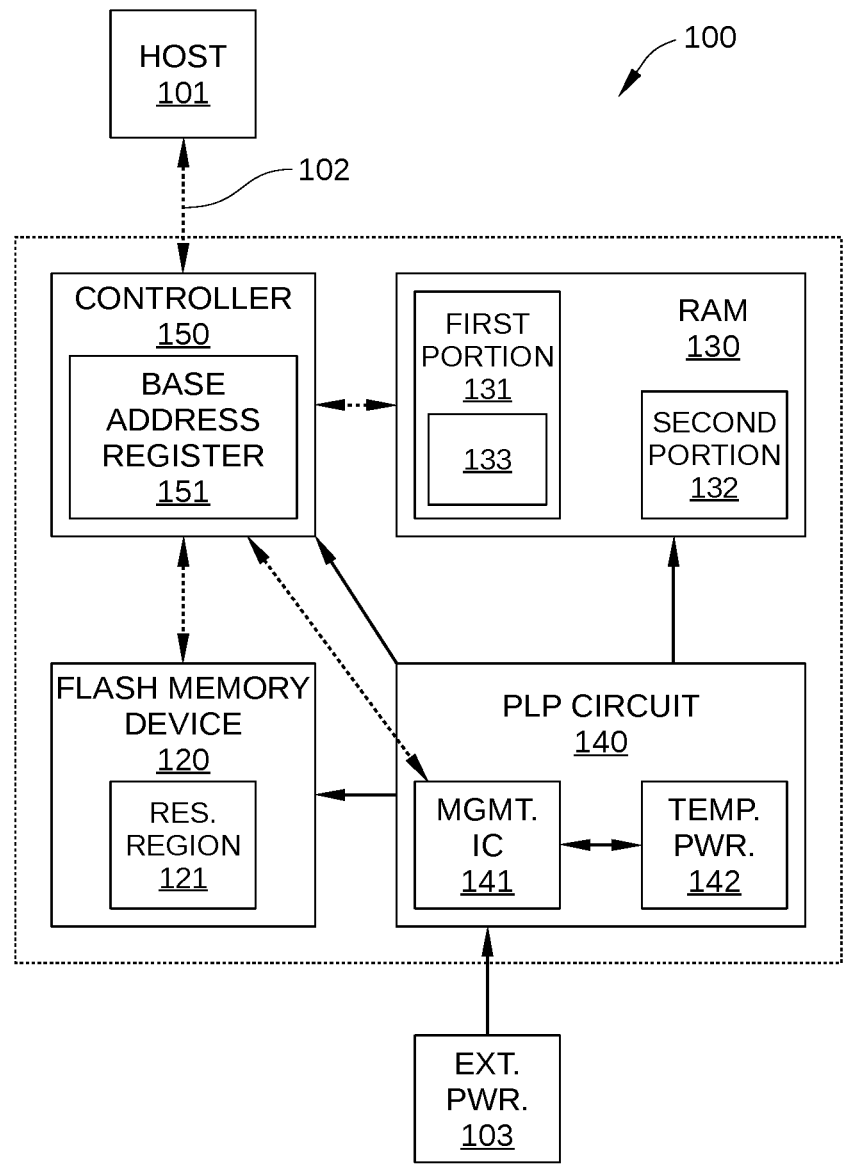
FIG. 1 is a block diagram of a solid-state drive (SSD), configured according to one or more embodiments.

FIG. 1 is a block diagram of a solid-state drive (SSD) 100, configured according to one or more embodiments. SSD 100 is a mass storage device that can be connected to a host 101 or other external entity and appears as two separate data storage devices to host 101. SSD 100 includes a flash memory device 120, a random-access memory (RAM) 130, a power-loss protection (PLP) circuit 140, and a controller 150. SSD 100 is communicatively coupled to host 101 via an interconnect 102, and is electrically coupled to an external power source 103.

Host 101 may be any external entity configured to store data in and retrieve data from SSD 100, such as a host computing device coupled to SSD 100 or an operating system of such a computing device, a cloud computing customer, a web application, and the like. In general, interconnect 102 may be any suitable communication interconnect between host 101 and SSD 100, including any one of an Ethernet, a serial advanced technology attachment (SATA), a serial attached small computer system interface (SAS), a small computer system interface (SCSI), or a peripheral component interconnect express (PCIe) interconnect. In the embodiment illustrated in FIG. 1, interconnect 102 is a PCIe interconnect. External power source 103 may be any technically feasible power source that provides power to SSD 100. For example, in embodiments in which SSD 100 is configured as an internally mounted computer expansion card (such as an M.2 card), external power source 103 may include one or more pins of the computer expansion card that couple to contacts on a motherboard-mounted connector.

Flash memory device 120 is configured to store data as requested by host 101, and includes a non-volatile solid-state storage medium, such as one or more NAND flash chips. A NAND flash chip can be electrically erased and reprogrammed, and retains data when external power source 103 is powered down or power from external power source 103 is unexpectedly interrupted. For clarity, SSD 100 is illustrated with a single flash memory device 120, but in some embodiments, SSD 100 may include multiple flash memory devices 120.

Flash memory device 120 includes a reserved region 121 that has an available storage capacity sufficient to store data that are currently stored in RAM 130. For example, in some embodiments, reserved region 121 includes the memory blocks in flash memory device 120 that are erased and ready to be programmed with new data. Thus, in the event of an unexpected interruption of power from external power source 103, the data currently stored in RAM 130 can be quickly copied to reserved region 121, since no garbage collection or other time-consuming operations are performed prior to copying the data stored in RAM 130 to flash memory device 120. In this way, data stored in RAM 130 can be copied to a nonvolatile memory device in a very short time, a time during which SSD 100 can be powered by a temporary power source associated with PLP circuit 140.

The available storage capacity of reserved region 121 is maintained by controller 150 by reserving a particular number of erased memory blocks from normal use in flash memory device 120. For example, in some embodiments, when the current number of erased memory blocks in flash memory device 120 falls below or within a predetermined threshold value of the particular number of erased memory blocks, controller 150 stops storing data in flash memory device 120 in response to host input/outputs (I/Os) and/or performs garbage collection operations, in which partially utilized memory blocks are consolidated into memory blocks that are either completely erased or completely filled with data. In this way, the available storage capacity of reserved region 121 is maintained at a targeted number of erased memory blocks.

In some embodiments, the available storage capacity of reserved region 121 is set to be equal to the total storage capacity of RAM 130. In some embodiments, controller 150 maintains the available storage capacity of reserved region 121 to be at least as large as a storage capacity of the physical locations in a first portion 131 and a second portion 132 (described below) of RAM 130. In yet other embodiments, controller 150 maintains the available storage capacity of reserved region 121 to be at least as large as a storage capacity of the physical locations in first portion 131 and second portion 132 that currently store data. Thus, in such embodiments, the available storage capacity of reserved region 121 may vary over time.

RAM 130 is a volatile solid-state memory device, such as a dynamic RAM (DRAM), and is configured for use as both short-term storage and longer-term storage of data. Specifically, RAM 130 is configured to store data that are frequently and/or continuously updated by controller 150 during operation of SSD 100 and data that are stored in response to I/O requests by host 101. To that end, RAM 130 includes a first portion 131 and a second portion 132.

First portion 131 includes physical locations, e.g., pages or blocks of storage cells, that are dedicated for use by controller 150 for internal operations of SSD 100. For example, controller 150 may store system data in first portion 131, such as a flash translation layer map, journaling data, a mapping table 133, etc. In addition, first portion 131 may be used as a cache and/or data buffer for flash memory device 120. By contrast, second portion 132 includes physical locations that are dedicated for storage of data that are associated with an addressable space available to host 101, such as a sequence of logical block addresses (LBAs). Thus, when host 101 requests that SSD 100 store data associated with a particular LBA or LBAs in this addressable space, controller 150 stores the data in physical locations of second portion 132 that correspond to the particular LBA or LBAs.

In some embodiments, the correspondence between the physical locations in second portion 132 and the LBAs of the addressable space associated with second portion 132 is substantially fixed. In such embodiments, data associated with a particular LBA will, excluding memory cell failures, be written to the same physical location in second portion 132 over the lifetime of SSD 100. Alternatively, in some embodiments, the correspondence between the physical locations in second portion 132 and the LBAs of the addressable space associated with second portion 132 may vary. In such embodiments, data associated with a particular LBA will generally be written to a different physical location in second portion 132 each time such data are stored in second portion 132. In either case, mapping table 133 is configured to track the correspondence between LBAs referenced in I/O requests by host 101 and physical memory locations in second portion 132 of data associated with these LBAs. Thus, mapping table 133 establishes a one-to-one correspondence between these LBAs and respective physical locations in second portion 132 of RAM 130 at any point in time.

PLP circuit 140 is configured to power SSD 100 for a finite time when external power source 103 is unexpectedly interrupted. Consequently, data stored in first portion 131 and second portion 132 of RAM 130 can be stored by controller 150 in reserved region 121 before such data are lost (i.e., when RAM 130 is no longer refreshed). PLP circuit 140 includes a management integrated circuit (IC) 141 and a temporary power source 142.

Management IC 141 is configured to monitor external power source 103 and temporary power source 142, and to alert controller 150 of the status of each. Management IC 141 is configured to detect interruption of power from external power source 103, to alert controller 150 of the interruption of power, and to switch temporary power source 142 from an "accept power" mode to a "provide power" mode. Thus, when an interruption of power from external power source 103 is detected, SSD 100 can continue to operate for a finite time, for example a few seconds or minutes, depending on the charge capacity of temporary power source 142. During such a time, controller 150 can copy data stored in first portion 131 and second portion 132 of RAM 130 to reserved region 121 of flash memory device 120. Furthermore, upon power restoration from external power source 103, controller 150 is configured to copy data stored in reserved region 121 to first portion 131 and second portion 132.

Management IC 141 also monitors the status of temporary power source 142, notifying controller 150 when temporary power source 142 has sufficient charge to power SSD 100 for a minimum target time. Generally, the minimum target time is a time period that is at least as long as a time required for controller 150 to copy data stored in first portion 131 and second portion 132 to reserved region 121. For example, in an embodiment in which the combined storage capacity of first portion 131 and second portion 132 is approximately 1 gigabyte (GB) and the data rate of SSD 100 is approximately 650 megabytes (MBs) per second, the minimum target time may be up to about two seconds. Thus, when management IC 141 determines that temporary power source 142 has insufficient charge to provide power to SSD 100 for two seconds, management IC 141 notifies controller 150. In some embodiments, when temporary power source 142 has insufficient charge to power SSD 100 for the minimum target time, controller 150 does not make LBAs associated with second portion 132 available to host 101 for storing data. In this way, host 101 is prevented from storing data in SSD 100 that may be lost in the event of power loss.

Temporary power source 142 may be any technically feasible device capable of providing electrical power to SSD 100 for a finite period of time, as described above. Suitable devices includes rechargeable batteries, dielectric capacitors, and electrochemical capacitors (also referred to as "supercapacitors"). The size, configuration, and power storage capacity of temporary power source 142 depends on a plurality of factors, including power use of SSD 100, the data storage capacity of first portion 131 and second portion 132 of RAM 130, the data rate of SSD 100, and space available for temporary power source 142. One of skill in the art, upon reading this disclosure herein, can readily determine a suitable size, configuration, and power storage capacity of temporary power source 142 for a particular embodiment of SSD 100.

Controller 150 is configured to control operation of SSD 100, and is connected to flash memory device 120 and RAM 130 via a high-speed data path, such as a double data rate (DDR) bus, a DDR2 bus, a DDR3 bus, or the like. Controller 150 is also configured to control interfacing of SSD 100 with host 110. Some or all of the functionality of controller 100 may be implemented as firmware, application-specific integrated circuits, and/or a software application. In the embodiment illustrated in FIG. 1, in which interconnect 102 comprises a PCIe interconnect, controller 100 includes base address registers (BARs) 151 that hold memory addresses used by SSD 100. Controller 100 uses BARs 151 to convert PCIe read and write commands received from host 101, e.g., MEMORY READ packets and MEMORY WRITE packets, into read and write commands compatible with RAM 130. Consequently, SSD 100 can store data in and read data from second portion 132 of RAM when host 101 sends PCIe read or write requests to SSD 100 that reference LBAs mapped to physical memory locations in second portion 132. Alternatively, controller 150 may include a direct memory access (DMA) controller that is programmed or otherwise configured to determine whether an I/O from host 101 should be directed to second portion 132 of RAM 130 or to flash memory device 120, depending on what range of LBAs are referenced by the host I/O.

Figure 2:
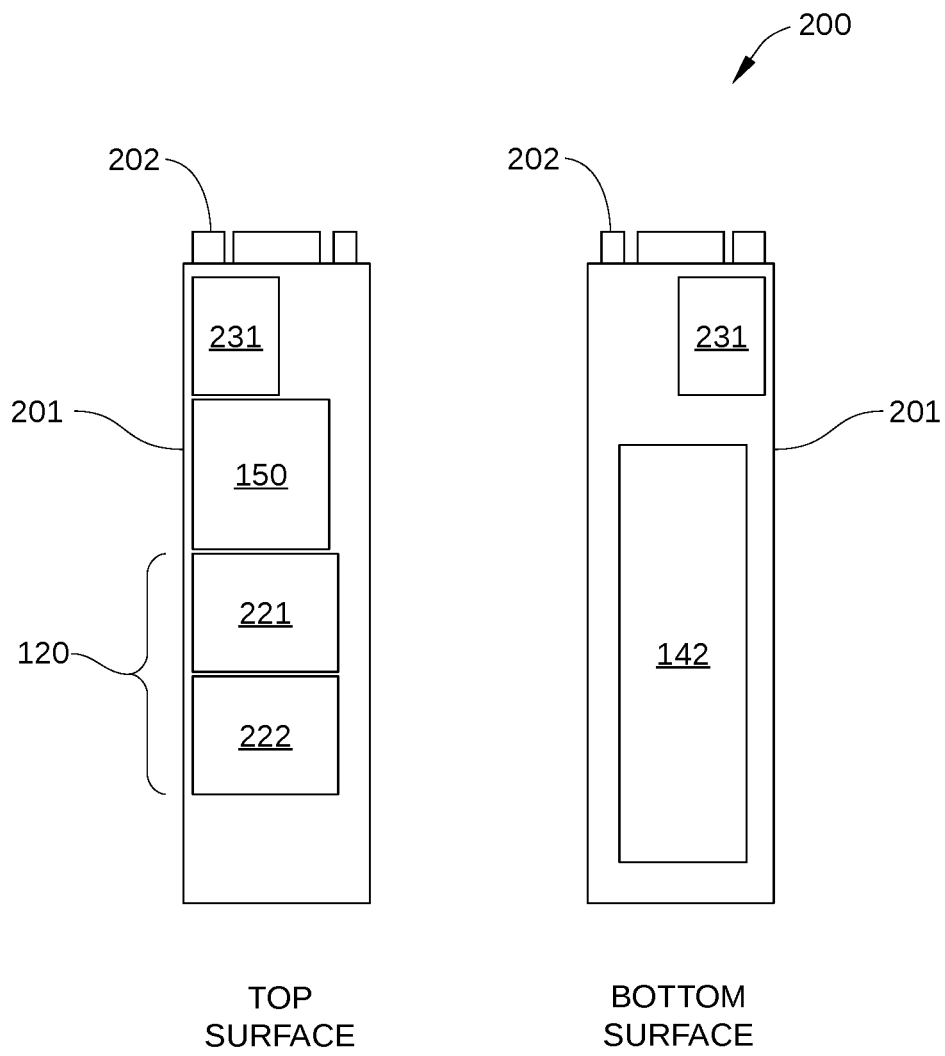
FIGS. 2A and 2B schematically illustrate one embodiment of the SSD of FIG. 1, according to one or more embodiments.

FIGS. 2A and 2B schematically illustrate one embodiment of SSD 100, according to one or more embodiments. FIG. 2A illustrates a top surface of an M.2 configuration 200 of SSD 100 and FIG. 2B illustrates a bottom surface of the M.2 configuration 200. As shown, configuration 200 includes a PCB 201 with a keyed interface 202, such as a PCIe non-volatile memory express (NVMe) interface, formed on one end for connection to a suitable mating connector. A first 2 GB double data rate (DDR) RAM 231 is mounted on a top surface of PCB 201 and a second 2 GB DDR RAM 232 is mounted on a bottom surface of PCB 201.

Controller 150 and flash memory device 120, which includes first 128 GB NAND chip 221 and second 128 GB NAND chip 222, are both mounted as shown on the top surface of PCB 201. Temporary power source 142 is mounted as shown on the bottom surface of PCB 201. It is noted that SSD 100, which includes temporary power source 142, 256 GB of NAND, and 2 GB of RAM, conforms to the M.2 form factor specification.

Figure 3:
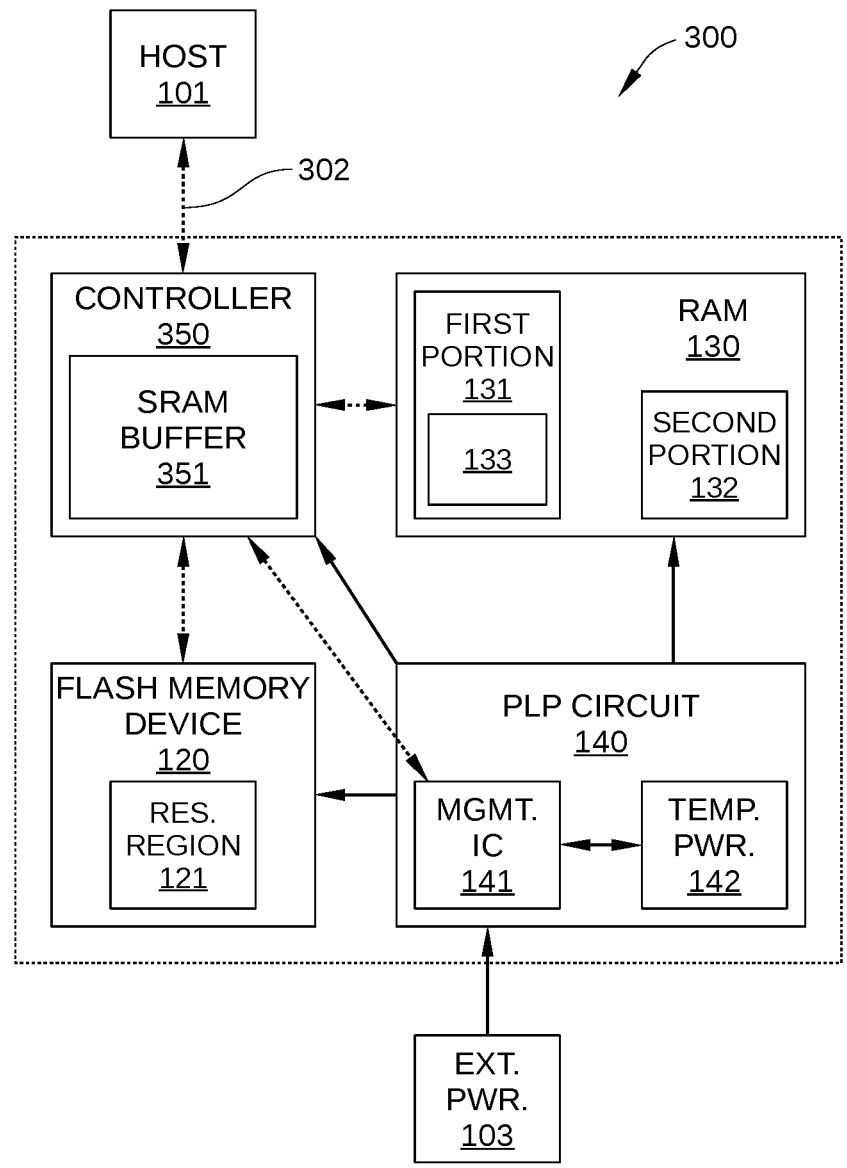
FIG. 3 is a block diagram of an SSD, configured according to one or more embodiments.

FIG. 3 is a block diagram of an SSD 300, configured according to one or more embodiments. SSD 300 is substantially similar in configuration to SSD 100, except that interconnect 302 comprises a SATA or SAS interconnect, rather than a PCIe interconnect. In addition, controller 350 includes an internal SRAM buffer 351 and does not include BAR 151. Controller 350 is configured to receive an I/O request from host 101, temporarily store the I/O in internal SRAM buffer 351, determine whether the I/O references LBAs that are associated with flash memory device 120 or with RAM 130, and complete the I/O accordingly. Thus, when an I/O from host 101 references an LBA associated with RAM 130, controller 351 stores data in or reads data from physical locations in second portion 132 that correspond to the LBA.

Figure 4:
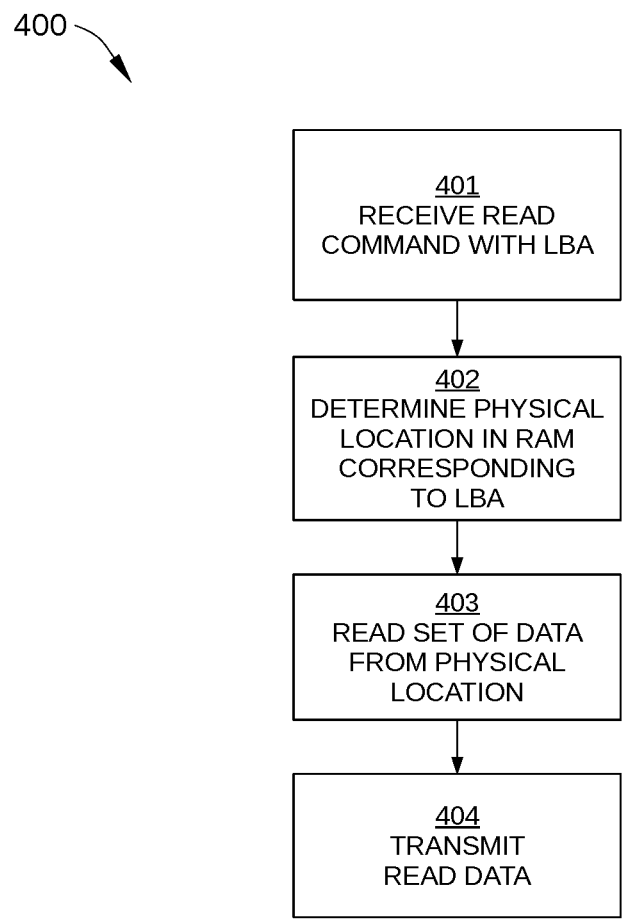
FIG. 4 sets forth a flowchart of method steps carried out by an SSD when a host makes a data retrieval request, according to one or more embodiments.

FIG. 4 sets forth a flowchart of method steps carried out by an SSD when a host makes a data retrieval request, according to one or more embodiments. The method steps of FIG. 4 may be performed in a data storage system that includes a flash memory device, a volatile RAM, and a controller, all coupled to a power loss protection circuit. Although the method steps are described in conjunction with SSD 100 of FIG. 1, persons skilled in the art will understand the method steps may be performed with other types of data storage systems.

As shown, a method 400 begins at step 401, in which controller 150 receives a read command from a computing device external to SSD 100 (e.g., host 101). The read command references an LBA or a sequence of LBAs that are associated with physical locations in second portion 132 of RAM 130. In step 402, based on the LBA referenced in the read command, controller 150 determines a physical location in RAM 130. In some embodiments, controller 150 consults mapping table 133 to determine the physical location in RAM 130 that corresponds to the LBA referenced in the read command. In step 403, controller 150 reads a set of data from the physical location in RAM 130 determined in step 402. In step 404, controller 150 transmits the data read in step 403 to host 101.

Figure 5:
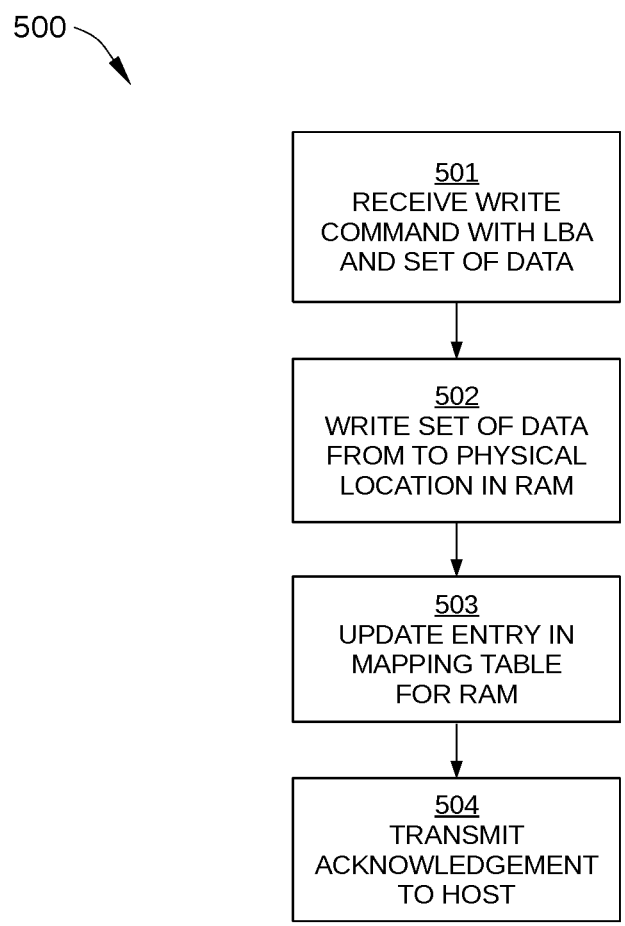
FIG. 5 sets forth a flowchart of method steps carried out by an SSD when a host makes a data storage request, according to one or more embodiments.

FIG. 5 sets forth a flowchart of method steps carried out by an SSD when a host makes a data storage request, according to one or more embodiments. The method steps of FIG. 5 may be performed in a data storage system that includes a flash memory device, a volatile RAM, and a controller, all coupled to a power loss protection circuit. Although the method steps are described in conjunction with SSD 100 of FIG. 1, persons skilled in the art will understand the method steps may be performed with other types of data storage systems.

As shown, a method 500 begins at step 501, in which controller 150 receives a write command from a computing device external to SSD 100 (e.g., host 101). The write command includes a set of write data and references an LBA or a sequence of LBAs that are associated with physical locations in second portion 132 of RAM 130. In step 502, controller 150 writes the set of data to the physical location in RAM 130 determined in step 502. In some embodiments, the physical locations to which the set of data are written in step 502 are determined by controller 150 by consulting mapping table 133. In other embodiments, the physical locations to which the set of data are written in step 502 are assigned by controller 150 based on availability. In step 503, controller 150 updates an entry in mapping table 133 to indicate a one-to-one correspondence between the LBA referenced in the write command and the physical location in second portion 132 to which the data set was written. In step 504, controller 150 sends and acknowledgment to host 101 indicating that the write command is completed.

In sum, embodiments described herein provide a solid-state drive with a DRAM and a power loss protection circuit. The power loss protection circuit can power the solid-state drive for a short but known time interval, allowing data stored in the DRAM to be copied to nonvolatile storage in the event of unexpected power loss. Because a controller for the solid-state drive is configured to direct I/O requests to either the flash memory drive or the DRAM, the DRAM is available to a host for use as a mass storage device, and can be used to safely store host data. Advantageously, a portion of the DRAM can be employed as a smaller, but much faster mass storage device than the flash memory of the solid-state drive.

While the foregoing is directed to embodiments of the present invention, other and further embodiments of the invention may be devised without departing from the basic scope thereof, and the scope thereof is determined by the claims that follow.

We claim:

1. A data storage device of a host device, comprising:
a flash memory device;
a volatile random access memory (RAM) that comprises a first region and a second region and is coupled to a power loss protection circuit; and
a controller configured to:
store, in the first region of the RAM, a mapping table that maps a first portion of logical block addresses (LBAs) to respective physical locations in the flash memory device and a second portion of the LBAs to respective physical locations in the second region of the RAM, the first region being a dedicated region for use by the controller for internal operations of the data storage device and for use as a cache or a data buffer,
store, in the second region of the RAM, data to be written to the flash memory device and data read from the flash memory device, the second region being a dedicated region for storage of data that is associated with an addressable space available to the host device and that has a plurality of LBAs associated therewith that are different from the LBAs associated with physical locations in the flash memory device, and
perform read and write operations with respect to the data stored in the second region of the RAM by using the mapping table stored in the first region of the RAM in response to commands from the host device, which reference either the first or the second portion of the LBAs.

2. The data storage device of claim 1, wherein the controller, in response to a write command from the host device, consults the mapping table to determine a target physical location to which an LBA referenced in the write command is mapped, and stores write data associated with the write command in the target physical location.

3. The data storage device of claim 1, wherein the controller is further configured to:

allocate a reserved region in the flash memory device that is as large as a storage capacity of the physical locations in the second region that are mapped by the second portion of the LBAs, and
in response to receiving a power loss indication from the power loss protection circuit, copy data that are associated with the second portion of the LBAs and stored in respective physical locations in the second region to the reserved region in the flash memory device.

4. The data storage device of claim 3, wherein the reserved region comprises erased data storage blocks of the flash memory device.

5. The data storage device of claim 1, wherein the first region stores system data.

6. The data storage device of claim 1, wherein the controller is further configured to receive data from the host device via one of a serial advanced technology attachment (SATA), a serial attached small computer system interface (SAS), a small computer system interface (SCSI), or a peripheral component interconnect express (PCIe) connection.

7. The data storage device of claim 1, wherein the power loss protection circuit comprises a management circuit and a temporary power source sized to power the controller, the flash memory device, and the RAM for a time sufficient for the controller to copy data that are associated with the second portion of the LBAs and stored in the physical locations in the second region to physical locations in a reserved region of the flash memory device.

8. The data storage device of claim 7, wherein the temporary power source comprises a supercapacitor.

9. The data storage device of claim 1, wherein the flash memory device, the RAM, the controller, and the power loss protection circuit are all mounted on a single printed circuit board.

10. The data storage device of claim 1, wherein the controller is configured to, upon determining that an LBA referenced in the write command is included in the second portion of the LBAs, store the write data in one of the physical locations in the second region.

11. The data storage device of claim 1, wherein the physical locations in the second region are dedicated for storage of data that are associated with the second portion of the LBAs and not for storage of data that are associated with the first portion of the LBAs.

12. The data storage device of claim 1, wherein the mapping table includes a fixed mapping between each of the physical locations in the second region and a respective LBA in the second portion of the LBAs.

13. The data storage device of claim 1, wherein the second portion of the LBAs comprises a portion of an addressable space available to the host device that does not overlap the first portion of the LBAs.

14. A method of reading and writing data in a data storage device of a host device, that includes a flash memory device, a volatile random access memory (RAM), and a controller, all coupled to a power loss protection circuit, the method comprising:
storing, in a first region of the RAM, a mapping table that maps a first portion of logical block addresses (LBAs) to respective physical locations in the flash memory device and a second portion of the LBAs to respective physical locations in a second region of the RAM, the first region being a dedicated region for use by the controller for internal operations of the data storage device and for use as a cache or a data buffer, storing, in a second region of the RAM, data to be written to the flash memory device and data read from the flash memory device, the second region being a dedicated region for storage of data that is associated with an addressable space available to the host device and that has a plurality of LBAs associated therewith that are different from the LBAs associated with physical locations in the flash memory device, and performing read and write operations with respect to the data stored in the second region of the RAM by using the mapping table stored in the first region in response to commands from the host device, which reference either the first or the second portion of the LBAs.

15. The method of claim 14, further comprising:

in response to a write command from the host device, consulting the mapping table to determine a target physical location to which an LBA referenced in the write command is mapped, and storing write data associated with the write command in the target physical location.

16. The method of claim 14, further comprising:

allocating a reserved region in the flash memory device that is as large as a storage capacity of the physical locations in the second region that are mapped by the second portion of the LBAs, and responsive to receiving a power loss indication from the power loss protection circuit, copying data that are associated with the second portion of the LBAs and stored in respective physical locations in the second region to the reserved region in the flash memory device.

17. The method of claim 16, wherein the reserved region comprises erased data storage blocks of the flash memory device.

18. The method of claim 14, wherein the first region stores system data.

19. The data storage device of claim 7, further comprising:

determining, by the management circuit, whether the temporary power source has sufficient charge to provide power to the flash memory device for the time sufficient for the controller to copy data that are associated with the second portion of the LBAs and stored in the physical locations in the second region to physical locations in a reserved region of the flash memory device, wherein, when the management circuit determines that the temporary power source does not have sufficient charge to provide power to the flash memory device for the time sufficient, the management circuit notifies the controller, and the controller does not make LBAs associated with the second portion of the LBAs available to the host device for storing data.

20. The method of claim 14, wherein the power loss protection circuit comprises a management circuit and a temporary power source sized to power the controller, the flash memory device, and the RAM for a time sufficient for the controller to copy data that are associated with the second portion of the LBAs and stored in the physical locations in the second region to physical locations in a reserved region of the flash memory device, the method further comprising:

determining, by the management circuit, whether the temporary power source has sufficient charge to provide power to the flash memory device for the time sufficient for the controller to copy data that are associated with the second portion of the LBAs and stored in the physical locations in the second region to physical locations in a reserved region of the flash memory device, and notifying, by the management circuit to the controller, when the management circuit determines that the temporary power source does not have sufficient charge to provide power to the flash memory device for the time sufficient, that the temporary power source does not have sufficient charge to provide power to the flash memory device for the time sufficient, wherein, based on the notification to the controller, the controller does not make LBAs associated with the second portion of the LBAs available to the host device for storing data.

* * * * *